UNITED STATES PATENT OFFICE.

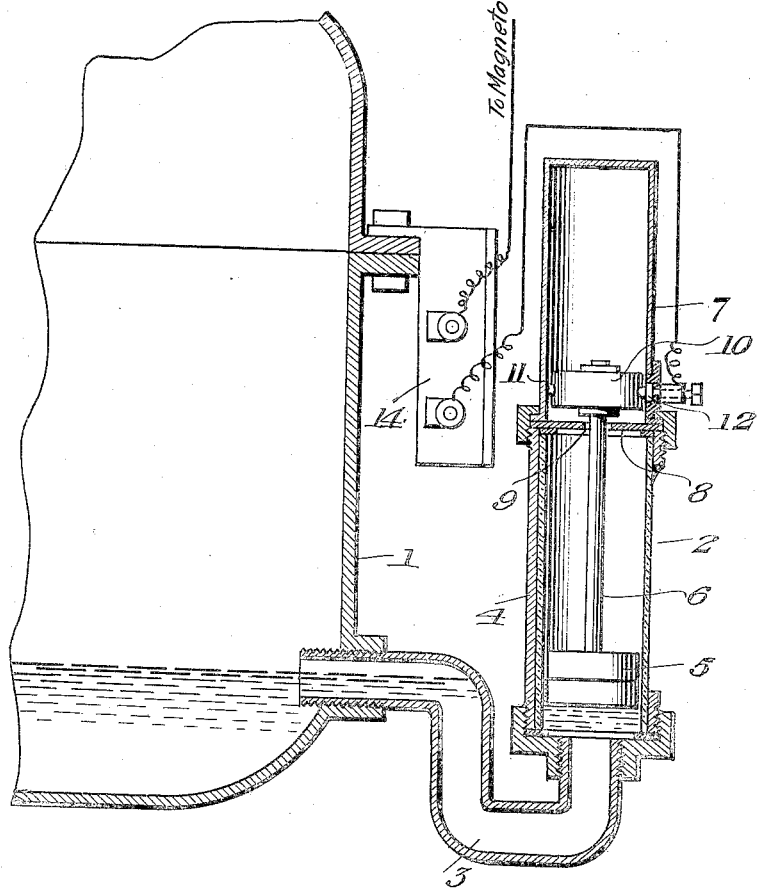
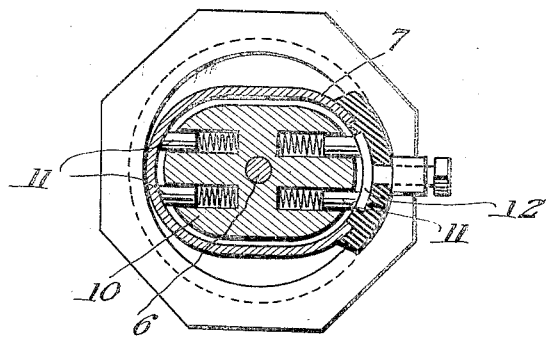

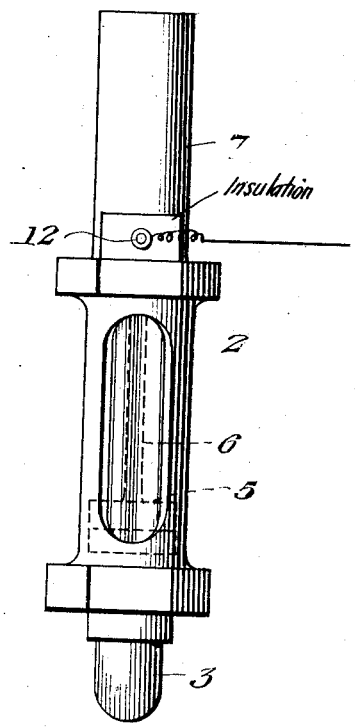
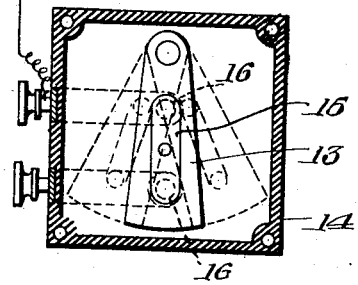
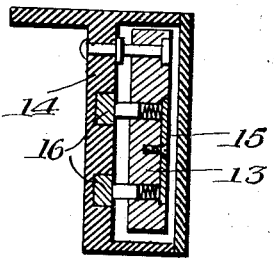

WALTER L. RIEDY, OF HOUGHTON, MICHIGAN.

GAGE.

1,345,243.   Specification of Letters Patent.   Patented June 29, 1920.

Application filed August 5, 1919. Serial No. 315,409.

*To all whom it may concern:*

Be it known that I, WALTER L. RIEDY, a citizen of the United States, residing at Houghton, in the county of Houghton and State of Michigan, have invented new and useful Improvements in Gages, of which the following is a specification.

This invention relates to means for automatically stopping the engine of an automobile or the like when the oil in the crank case reaches a low level or the case is entirely empty, and the principal object of the invention is to provide means for grounding the ignition circuit when the oil level becomes low.

Another object of the invention is to provide a gage so that the level of oil in the crank case may be seen.

Still another object of the invention is to provide means for preventing the breaking of the ignition circuit by the device when the level of oil is changed by the automobile running up an incline.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a sectional view showing the invention connected with the crank case of an automobile;

Fig. 2 is an enlarged view of the front side of the gage;

Fig. 3 is a sectional detail view showing the brush carrier when the brush is carried thereby;

Fig. 4 is a detail view of the pendulum means for preventing the breaking of the circuit by the device when the automobile is running up or down;

Fig. 5 is a sectional view of such means.

In these views 1 indicates a portion of the crank case of an automobile and 2 indicates the gage which is connected to the lower part of the case by the pipe 3. This gage consists of the lower part 4 which is preferably of oval shape and is formed of a shell of any suitable material and carrying transparent portions, as shown. This part of the gage carries a float 5 and a rod 6 and has its lower end secured to the top of the float and extends upwardly through the lower part of the gage. The upper part of the gage is formed of an oval shell 7 which may be suitably connected with the lower part or this shell may form a continuation of the shell of the lower part. The two parts of the gage are separated by the plate 8 having a central hole 9 therein through which the rod 6 extends. A piston 10 is adjustably connected to the upper end of the rod 6 and said piston works in the shell 7. This piston carries the brushes or contacts 11 which are formed of spring plungers as shown. The lower portion of the shell 7 carries a contact 12 which is insulated from said shell and is located in the path of some of the brushes 11 so that when the piston 10 is in its lowest position said brushes will engage the contact 12 and as this contact is connected with a part of the ignition circuit, said circuit will be grounded through the metal parts of the gage and the crank case and thus the motor will stop. As parts of the gage are made of glass or other transparent material, the position of the float therein may be seen so that one may tell at a glance how much oil is in the crank case. If the level of oil should be permitted to get too low so as to cause the float to drop low enough to permit the brushes on the piston to engage the contact 12 the engine will automatically stop as before described.

In order to prevent the device from stopping the engine when the oil level should change owing to the automobile running up or down a hill, I provide a pendulum 13 which is carried by the supporting block 14. This pendulum in its normal position has its conducting strip 15 bridging the space between the two contacts 16 carried by the block 14. These contacts 16 are connected with the circuit leading from the contact 12 to the ignition circuit. It will thus be seen that when the pendulum 13 is in its normal position with part of the circuit between the contact 12 and the ignition, it will be closed so that the ignition circuit will be grounded when the brushes on the piston 10 engage the contact 12 but when the automobile is running up or down hill the pendulum will swing outwardly so that it no longer bridges the contacts and thus the ignition circuit will be disconnected from the contact 12 so that it will be impossible for the mechanism in the gage to break the ignition circuit even though the brushes should contact with the contact 12. The block 14 is made of suitable insulating material as is also portions of the pendulum and said block may be secured to any part of the automobile or it may be secured to the gage.

I prefer to connect the wire leading from the contact 12 to a contact on the magneto so that said magneto will be grounded when the brushes on piston 10 engage contact 12.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A device of the class described comprising a gage connected with the crank case of the motor, a float in the gage, means actuated by said float for grounding the ignition circuit of the motor and means for rendering the first mentioned means inoperative when the automobile is on an incline.

2. A device of the class described comprising a casing connected with the crank case of the motor, a float in said casing, a piston in the upper part of the casing, a rod connecting the float and piston together, a contact adapted to be connected with the ignition circuit of the motor and brushes in the form of spring plungers carried by the piston, some of said brushes engaging the walls of the casing and others adapted to engage the contact for grounding the ignition circuit.

3. A device of the class described comprising a casing connected with the crank case of a motor, a float in said casing, a piston connected with the float, brushes on said piston, a contact adapted to be engaged by said brushes, a block, a pair of contacts thereon spaced apart, means for connecting one of said contacts with the contact on the casing and the second contact with the ignition circuit and a pendulum mounted on the block and carrying a strip for bridging said contacts in the normal position of the pendulum and being disengaged from said contact when the pendulum swings away from its normal position.

In testimony whereof I affix my signature.

WALTER L. RIEDY.